United States Patent
Jourdier et al.

(10) Patent No.: US 6,915,664 B2
(45) Date of Patent: Jul. 12, 2005

(54) METHOD OF MANUFACTURING A FLUORINE-DOPED SILICA POWDER

(75) Inventors: Pierryle Jourdier, Paris (FR); Jean-Florent Campion, Conflans St Honorine (FR); Jean-Maxime Saugrain, Le Vesinet (FR); Christelle Lavallade, Hickory, NC (US); Claire Wane Nguila, Paris (FR)

(73) Assignee: Alcatel, Paris (FR)

( * ) Notice: Subject to any disclaimer, the term of this patent is extended or adjusted under 35 U.S.C. 154(b) by 421 days.

(21) Appl. No.: 10/157,203

(22) Filed: May 30, 2002

(65) Prior Publication Data

US 2002/0194878 A1 Dec. 26, 2002

(30) Foreign Application Priority Data

May 31, 2001 (FR) .............................. 01 07155

(51) Int. Cl.⁷ .......................... C03B 37/00; C01B 33/12
(52) U.S. Cl. ............................. 65/21.1; 65/397; 423/335
(58) Field of Search ....................... 65/397, 17.2, 17.3, 65/17.5, 17.6, 33.1, 21.1; 501/2, 3, 11, 27, 30; 427/215, 226; 423/335, 265

(56) References Cited

U.S. PATENT DOCUMENTS

| | | | |
|---|---|---|---|
| 3,535,890 A | | 10/1970 | Hanson et al. |
| 4,043,789 A | * | 8/1977 | Hansen et al. .................. 71/34 |
| 4,152,502 A | * | 5/1979 | Levine et al. .................. 526/96 |
| 4,181,623 A | * | 1/1980 | Dillarstone et al. ......... 510/182 |
| 5,039,325 A | * | 8/1991 | Miller et al. .................. 65/397 |
| 5,063,179 A | * | 11/1991 | Menashi et al. ............... 501/12 |
| 5,064,796 A | | 11/1991 | Speca |
| 5,516,350 A | * | 5/1996 | Onoda et al. ................. 65/17.2 |
| 5,562,752 A | * | 10/1996 | Fleming, Jr. .................. 65/384 |
| 5,888,587 A | * | 3/1999 | Campion ..................... 427/452 |
| 6,007,786 A | * | 12/1999 | Campion et al. ............ 422/189 |
| 6,047,568 A | * | 4/2000 | Campion ..................... 65/395 |
| 6,071,487 A | * | 6/2000 | Campion et al. ........... 423/338 |
| 6,071,614 A | * | 6/2000 | Farooq ....................... 428/403 |
| 6,319,550 B1 | * | 11/2001 | Campion et al. ........... 427/215 |
| 6,385,384 B1 | * | 5/2002 | Wei ............................ 385/141 |
| 6,386,373 B1 | * | 5/2002 | Jourdier et al. ............... 209/11 |
| 2004/0118155 A1 | * | 6/2004 | Brown et al. ................. 65/17.2 |

FOREIGN PATENT DOCUMENTS

| | | |
|---|---|---|
| EP | 0 281 282 A1 | 9/1988 |
| EP | 0 629 587 A1 | 12/1994 |

OTHER PUBLICATIONS

Material Safety Data Sheet: Ammonium Bifluoride, 5 pages retrieved from online Sep. 15, 2004.*

Timokhin A R et al: "Chemical Reaction of Ammonium Bifluoride with Quartz Glass" Glass and Ceramis, vol. 42, No. 5–6, May 1985, pp. 267–269.

* cited by examiner

Primary Examiner—Steven P. Griffin
Assistant Examiner—Carlos Lopez
(74) Attorney, Agent, or Firm—Sughrue Mion, PLLC

(57) ABSTRACT

The invention relates to a method of doping silica with fluorine. The method described comprises mixing a powder of silica granules with a solid fluorine compound, thermally decomposing the solid fluorine compound under an inert atmosphere, and densifying the granules to obtain dense grains of doped silica. It is preferable to use ammonium bifluoride. The invention is applicable to preparing high index silica glass, in particular for fabricating optical fiber preforms.

10 Claims, No Drawings

METHOD OF MANUFACTURING A FLUORINE-DOPED SILICA POWDER

The invention relates to a method of manufacturing a fluorine-doped silica powder, the doped silica being for making optical fiber preforms.

BACKGROUND OF THE INVENTION

Doping is an operation which consists in incorporating atoms or molecules in a material in order to modify the properties of the material. For example, in the field of optical fibers, dopants are incorporated in silica in order to modify its refractive index. The dopant can then be germanium if it is desired to increase the refractive index of the silica, or fluorine if it is desired on the contrary to lower the index.

The silica used can be natural silica or synthetic silica. Nevertheless, in the field of optical fibers, it is synthetic silica that is used most often. Synthetic silica is silica that is obtained by chemical synthesis, e.g. by oxidation of a silica-precursor gas in the presence of heat, for example silicon tetrachloride $SiCl_4$. That reaction leads to a powder that is very pure with a grain size that is very fine, i.e. a grain size lying in the range 0.1 nanometers (nm) to 100 nm, and as a result the powder has a high specific surface area. Such a silica powder is known as "soot".

Silica soot can be used, for example, to fabricate a preform by the method of vapor axial deposition (VAD) or outside vapor deposition (OVD).

Document JP 62252335 describes a method of fabricating a preform in which the silicon compound is hydrolyzed in the presence of silicon oxifluoride, thus leading to a deposit of fluorine-containing silica soot which is subsequently vitrified.

Those methods are well known to the person skilled in the art of optical fibers, and they are not described in greater detail below.

Silica soot can also be transformed using the method described in document EP 0 578 553. The resulting silica grains can then be deposited and vitrified in order to increase the diameter of primary preforms manufactured by the modified chemical vapor deposition (MCVD) method.

In order to manufacture those silica grains, the particles of soot are agglomerated by a sol-gel method so as to form granules, and the granules are then densified by heating, which enables the pores that exist between the various particles making them up to be eliminated so that the resulting grains are dense. In general, such grains are of a size that is greater than 1 micron ($\mu$m). The term "silica granule" is used to designate a porous particle of silica at an intermediate stage in the fabrication of densified silica grains.

It is possible to perform the operation of densifying granules under an atmosphere containing a gas that is a precursor of the desired dopant. Thus, in order to fluorinate silica granules, densification is performed under an atmosphere containing a fluorine-containing gas such as sulfur hexafluoride $SF_6$ or silicon tetrafluoride $SiF_4$. The granules of silica are placed in a crucible which is in turn placed in an oven so as to raise it to the temperature that enables densification to take place, the oven being fed with a gas that is a precursor of the desired dopant. Doping takes place by diffusion and reaction of the dopant molecules in the silica granules, thereby leading to the formation of complex molecules of the $SiO_{2-x}F_{2x}$ type. The method is performed at high temperature, i.e. around 1400° C.

An alternative device enabling moving granules to be densified in the presence of a fluorine-containing gas is described in FR 2 749 005.

Those methods give rise to a certain number of problems.

The first drawback lies in the aggressivity of fluorine-containing gases. The high corrosivity of the fluorine-containing gases that are used at high temperature gives rise to massive corrosion of the ovens, thereby leading to high maintenance costs. Another problem is the handling of such gases and their treatment or recovery that is required because of their toxicity. Finally, these gases, and in particular $SiF_4$, are of non-negligible costs.

Their second drawback lies in the lack of uniformity of the doping that is achieved in this way, which lack of uniformity is associated with the way the fluorine-containing reagent diffuses within the powder being treated, particularly when the powder is deposited in a crucible.

OBJECT AND SUMMARY OF THE INVENTION

The object of the present invention thus consists in providing a method of fabricating a powder of dense fluorine-doped silica grains that enables the corrosion of equipment to be reduced considerably and that does not present the above-mentioned drawbacks.

The present invention thus provides a method of fabricating a fluorine-doped silica powder for making optical fiber preforms, the method comprising the steps of:

mixing a solid fluorine compound with silica granules having a specific surface area greater than 30 square meters per gram ($m^2/g$)

thermally decomposing said solid fluorine compound; and densifying the resulting doped silica granules to obtain doped silica grains.

The silica granules are mixed with the desired quantity of the solid fluorine compound and they are introduced into a suitable receptacle. In one implementation, the mixture of silica granules and of solid fluorine compound contains 1% to 30% and in particular 2% to 12% of solid fluorine compound.

It is preferable to use a crucible made of a material such as quartz that withstands fluorine at the treatment temperature.

The oven used for the method can be a horizontal rotary oven made of quartz, which presents the additional advantage of being capable of operating continuously. A static oven with a quartz reactor could also be used. It can be placed horizontally or vertically, but it is preferable for it to be placed vertically. This presents the advantage of minimizing the exchange area between the powder and the atmosphere, and thus of minimizing evaporation of $SiF_4$. In any event, the oven is continuously swept with an inert gas such as helium.

It is preferable to use granules of synthetic silica presenting a specific surface area lying in the range 30 $m^2/g$ to 200 $m^2/g$. It is assumed that the released fluorinating agent preferentially attacks the OH sites of the silica. The number of these sites depends on the specific surface area of the silica. Thus, it can be expected that a very finely divided silica enables a higher degree of fluorine doping to be achieved. Thus, when it is desired to obtain fluorine-doped silica, it is preferable to use silica granules having a high specific surface area. A specific surface area greater than 30 $m^2/g$ is therefore advantageous.

In an implementation, the solid fluorine compound is ammonium bifluoride. Nevertheless, it is also possible to envisage using other solid fluorine compounds that are thermally unstable.

Furthermore, the method is preferably carried out at moderate temperature, i.e. lower than 1450° C., and preferably in the range 250° C. to 600° C. The decomposition temperature is preferably less than or equal to 600° C., in particular it is less than or equal to 425° C. The fluorine compound used decomposes at moderate temperature, i.e. at lower than 1450° C., preferably lower than 600° C. It is found that even at 250° C., the fluorine-containing reagent diffuses quickly through the granules. The length of time the decomposition temperature is maintained may be less than 1 hour (h), and it preferably lies in the range 15 minutes (min) to 60 min.

In an implementation, the mixture is maintained at the decomposition temperature for a duration of 15 min to 60 min.

The densification step itself is known. A conventional oven, e.g. made of graphite, can be used, thereby constituting an additional advantage of the method of the invention. The densification treatment is preferably also performed under an inert atmosphere.

In an implementation, the method is performed continuously.

The first advantage of the method of the invention is that potentially corrosive compounds are given off at moderate temperature, thereby considerably reducing equipment wear.

The second advantage of the method of the invention is that by causing the fluorinating agent to be given off in situ, it is possible to ensure that fluorine is incorporated uniformly in the silica granules.

DETAILED DESCRIPTION OF THE INVENTION

The invention is illustrated in greater detail by the following examples.
Flourination

EXAMPLE 1

94 grams (g) of synthetic silica granules having a specific surface area of 50 m$^2$/g and 6 g of ammonium bifluoride (6%) were introduced into a quartz crucible having a diameter of 50 millimeters (mm) and a height of 144.5 mm. The crucible was introduced into a quartz reactor placed in a vertical oven. The mixture was then raised over 20 min to 250° C. while being swept with helium, and its temperature was then maintained for 15 min. Thereafter, it was allowed to cool to ambient temperature (duration 150 min).

A sample was subsequently put into solution by alkaline sintering and its fluorine content was assayed by ionometry. The results obtained are given in Table 1.

EXAMPLE 2

91 g of synthetic silica granules identical to those of Example 1 and 9 g of ammonium bifluoride (9%) were introduced into a crucible identical to that of Example 1. The crucible was introduced into a quartz reactor placed in a vertical furnace. The mixture was then heated over 30 min to 425° C. while being swept with helium, and thereafter the temperature was maintained for 15 min. The temperature was then allowed to cool down to ambient (duration 150 min).

The sample was assayed as in Example 1. There results obtained are given in Table 1.

EXAMPLE 3

92 g of synthetic silica granules identical to those of Example 1 and 9 g of ammonium bifluoride (9%) were introduced into a crucible identical to that of Example 1. The crucible was introduced into a quartz reactor placed in a vertical furnace. The mixture was then heated over 75 min to 600° C. while being swept with helium, and thereafter the temperature was maintained for 60 min. The temperature was then allowed to cool down to ambient (duration 150 min).

The sample was assayed as in Example 1. There results obtained are given in Table 1.

EXAMPLE 4

88 g of synthetic silica granules identical to those of Example 1 and 12 g of ammonium bifluoride (12%) were introduced into a crucible identical to that of Example 1. The crucible was introduced into a quartz reactor placed in a vertical furnace. The mixture was then heated over 75 min to 600° C. while being swept with helium, and thereafter the temperature was maintained for 15 min. The temperature was then allowed to cool down to ambient (duration 150 min).

The sample was assayed as in Example 1. There results obtained are given in Table 1.

EXAMPLE 5

94 g of synthetic silica granules identical to those of Example 1 and 6 g of ammonium bifluoride (6%) were introduced into a crucible identical to that of Example 1. The crucible was introduced into a quartz reactor placed in a vertical furnace. The mixture was then heated over 75 min to 600° C. while being swept with helium, and thereafter the temperature was maintained for 15 min. The temperature was then allowed to cool down to ambient (duration 150 min).

The sample was assayed as in Example 1. There results obtained are given in Table 1.

EXAMPLE 6

56.40 g of synthetic silica granules identical to those of Example 1 and 3.60 g of ammonium bifluoride (6%) were weighed out into a crucible made from a quartz tube having a diameter of 46 mm that was truncated and closed flat at each end. The mixture was introduced into a quartz reactor placed in a horizontal oven. The mixture was then heated over 75 min to 600° C. while being swept with helium, and the temperature was then maintained for 15 min. Thereafter it was allowed to cool to ambient temperature.

The sample was assayed as mentioned in Example 1. The results are given in Table 1.

EXAMPLE 7

58.56 g of synthetic silica granules identical to those of Example 1 and 1.44 g of ammonium bifluoride (2.4%) were weighed out into a crucible identical to that of Example 6. The mixture was introduced into a quartz reactor placed in a vertical oven. The mixture was then heated over 75 min to 600° C. while being swept with helium, and the temperature was maintained for 60 min. Thereafter it was allowed to cool to ambient temperature.

A sample was assayed as mentioned in Example 1. The results are given in Table 1.

EXAMPLE 8

57.48 g of synthetic silica granules identical to those of Example 1 and 2.52 g of ammonium bifluoride (4.2%) were weighed out into a crucible identical to that of Example 6. The mixture was introduced into a quartz reactor placed in a vertical oven. The mixture was then heated over 30 min to 425° C. while being swept with helium, and the temperature was maintained for 37.5 min. Thereafter it was allowed to cool to ambient temperature.

A sample was assayed as mentioned in Example 1. The results are given in Table 1.

EXAMPLE 9

56.40 g of synthetic silica granules identical to those of Example 1 and 3.60 g of ammonium bifluoride (6%) were weighed out into a crucible identical to that of Example 6. The mixture was introduced into a quartz reactor placed in a vertical oven. The mixture was then heated over 20 min to 250° C. while being swept with helium, and the temperature was maintained for 60 min. Thereafter it was allowed to cool to ambient temperature.

A sample was assayed as mentioned in Example 1. The results are given in Table 1.

EXAMPLE 10

58.56 g of synthetic silica granules identical to those of Example 1 and 1.44 g of ammonium bifluoride (2.4%) were weighed out into a crucible identical to that of Example 6. The mixture was introduced into a quartz reactor placed in a vertical oven. The mixture was then heated over 20 min to 250° C. while being swept with helium, and the temperature was maintained for 15 min. Thereafter it was allowed to cool to ambient temperature.

A sample was assayed as mentioned in Example 1. The results are given in Table 1.

TABLE 1 fluorination

| Example | Temperature [° C.] | Duration [min] | NH$_4$F, HF introduced [%] | Fluorine incorporated [ppm] |
|---------|---------------------|----------------|----------------------------|------------------------------|
| 1  | 250 | 15   | 6   | 19500 |
| 2  | 425 | 15   | 9   | 11000 |
| 3  | 600 | 60   | 9   | 9800  |
| 4  | 600 | 15   | 12  | 13500 |
| 5  | 600 | 15   | 6   | 11400 |
| 6  | 600 | 15   | 6   | 8100  |
| 7  | 600 | 60   | 2.4 | 5500  |
| 8  | 425 | 37.5 | 4.2 | 7390  |
| 9  | 250 | 60   | 6   | 8900  |
| 10 | 250 | 15   | 2.4 | 7600  |

DENSIFICATION

EXAMPLE 11–15

The fluorine-doped silica granules obtained in Examples 1 to 5 were densified at 1450° C. in an alumina tube oven while being swept with helium in a crucible identical to that used during fluorination. The heating program was as follows:

free heating up to 1100° C.;
140° C./h from 1100° C. to 1300° C.;
85° C./h from 1300° C. to 1400° C.;
50° C./h from 1400° C. to 1450° C.;
1450° C. for 15 min; and
cooling down to a temperature of 200° C. at the outlet from the oven for cooling down to ambient temperature.

After the operation, a powder comprising dense grains of fluorine-doped silica was obtained suitable for use in fabricating optical fiber preforms. Fluorine content was determined by ionometric assay after being put into solution by alkaline sintering. The results are given in Table 2.

TABLE 2 densification

| Example | F content in the granules [ppm] | F content in the grams [ppm] |
|---------|----------------------------------|-------------------------------|
| 11 | 19500 | 3980 |
| 12 | 11000 | 5240 |
| 13 | 9800  | 3800 |
| 14 | 13500 | 3730 |
| 15 | 11400 | 4400 |

The results show clearly that the method of the invention enables synthetic silica to be doped with fluorine at low temperature. The resulting powder of dense silica grains presents a fluorine content that can be as high as 5000 parts per million (ppm) of fluorine after densification.

This method reduces the corrosion observed while doping silica with fluorine using gaseous compounds, and it provides for uniform distribution of fluorine within the dense grains of silica. Thus, the method makes it possible to obtain smaller variation in index within an optical fiber preform than is the case when using the prior art method of fluorination in a crucible.

What is claimed is:

1. A method of fabricating a fluorine-doped silica powder for making optical fiber performs, the method comprising the steps of:

mixing a solid fluorine compound with silica granules having a specific surface area greater than 30 m$^2$/g;

thermally decomposing said solid fluorine compound to obtain doped silica granules; and densifying the doped silica granules to obtain doped silica grains.

2. A method according to claim 1, in which the solid fluorine compound is ammonium bifluoride.

3. A method according to claim 1, in which the decomposition temperature of said solid fluorine compound is lower than or equal to 600°/C.

4. A method according to claim 3, in which said decomposition temperature is lower than or equal to 425° C.

5. A method according to claim 1, in which the mixture of silica granules and solid fluorine compound contains 1% to 30% by weight of solid fluorine compound.

6. A method according to claim 5, in which said mixture of silica granules and solid fluorine compound contains 20% by weight of solid fluorine compound.

7. A method according to claim 1, in which the mixture is maintained at the thermal decomposition temperature for a duration lying in the range 15 min to 60 min.

8. A method according to claim 1, wherein densification is performed under an inert atmosphere.

9. A method according to claim 1, in which thermal decomposition is carried out in a vertical oven or in a rotary horizontal oven.

10. A method according to claim 1, the method being continuous.

* * * * *